(12) United States Patent
Akuta et al.

(10) Patent No.: US 7,726,439 B2
(45) Date of Patent: Jun. 1, 2010

(54) APPARATUS FOR STEERING A VEHICLE

(75) Inventors: Yoshimitsu Akuta, Saitama (JP); Nobuo Sugitani, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 399 days.

(21) Appl. No.: 11/021,160

(22) Filed: Dec. 22, 2004

(65) Prior Publication Data

US 2005/0145433 A1 Jul. 7, 2005

(30) Foreign Application Priority Data

Jan. 7, 2004 (JP) .............................. 2004-001686

(51) Int. Cl.
B62D 5/04 (2006.01)
(52) U.S. Cl. .................. 180/444; 180/402; 180/405
(58) Field of Classification Search ................. 180/402, 180/405, 444; 280/93.514
See application file for complete search history.

(56) References Cited

U.S. PATENT DOCUMENTS

| | | | | | |
|---|---|---|---|---|---|
| 3,267,763 | A | * | 8/1966 | Merritt | 74/422 |
| RE28,740 | E | * | 3/1976 | Bishop | 74/422 |
| 4,658,927 | A | * | 4/1987 | Kanazawa | 180/422 |
| 5,482,130 | A | * | 1/1996 | Shimizu | 180/447 |
| 5,887,675 | A | * | 3/1999 | Hackl et al. | 180/422 |
| 6,173,221 | B1 | * | 1/2001 | Boehringen et al. | 701/41 |
| 6,302,441 | B1 | * | 10/2001 | Kawamuro et al. | 280/771 |
| 6,580,989 | B1 | * | 6/2003 | Husain et al. | 701/41 |
| 6,585,074 | B2 | * | 7/2003 | Katou et al. | 180/428 |
| 6,896,090 | B2 | * | 5/2005 | Kanda et al. | 180/402 |
| 2004/0016594 | A1 | * | 1/2004 | Yasui et al. | 180/446 |
| 2004/0129490 | A1 | * | 7/2004 | Kodama et al. | 180/402 |
| 2005/0082107 | A1 | * | 4/2005 | Husain et al. | 180/402 |

FOREIGN PATENT DOCUMENTS

| | | |
|---|---|---|
| JP | 07-257406 | 10/1995 |
| JP | 09-202251 | 8/1997 |
| JP | 11-005551 | 1/1999 |
| JP | 2000-127985 | 5/2000 |
| JP | 2003-137127 | 5/2003 |
| JP | 2003-182622 | 7/2003 |

* cited by examiner

Primary Examiner—Lesley Morris
Assistant Examiner—Maurice Williams
(74) Attorney, Agent, or Firm—Carrier, Blackman & Associates, P.C.; Joseph P. Carrier; William D. Blackman

(57) ABSTRACT

An apparatus for steering a vehicle includes a hand steering device, a road wheel steering device, a steering motor and a connection device. The hand steering device is a device which a driver of the vehicle manipulates for steering road wheels. The road wheel steering device actuates the road wheels. The steering motor, which is attached to the road wheel steering device, produces an assist force for the road wheels. The connection device selectively connects and disconnects the hand steering device and the road wheel steering device. In the apparatus, a ratio of a displacement made by the hand steering device to a displacement generated by the road wheel steering device increases as a speed of the vehicle becomes greater while the vehicle is traveling in a predetermined range of speed, and a gradient of the ratio is adapted to be greater when the speed is lower.

7 Claims, 10 Drawing Sheets

APPARATUS FOR STEERING A VEHICLE

BACKGROUND OF THE INVENTION

1. Field of the Invention

An apparatus consistent with the present invention relates to an apparatus for steering a vehicle, which is able to establish not only a configuration where a hand steering device and a road wheel steering device are mechanically unconnected to each other during normal traveling, but also establish the configuration these components are mechanically connected so as to facilitate mechanical steering during a system failure such as an electrical malfunction.

2. Discussion of Background Art

An apparatus for steering a vehicle with a steer-by wire method has been equipped with a connection device, which mechanically connects a mechanism for transmitting force to road wheels and a mechanism for transmitting reaction force to a hand steering device so that a reaction force is appropriately applied to the hand steering device. Japanese Published Patent Application 2003-137127 discloses related arts.

FIG. 11 is a sectional view showing a conventional apparatus for steering a vehicle with steer-by-wire method.

As shown in FIG. 11, an apparatus 100 for steering a vehicle with steer-by-wire method has two motors, one motor M1 for generating reaction force and the other motor M2 for generating steering force.

The motor M1 serves as a power source which applies a reaction force to a hand steering device such as a steering wheel (not shown). Through a mechanism 110 for transmitting reaction force, the motor M1 is mechanically connected to an input shaft 130 that is mechanically connected to the hand steering device (not shown).

The motor M2 serves as a power source for applying a force to road wheels W. Through a mechanism 140 for transmitting steering force and a shaft 150, the motor M2 is mechanically connected to an output shaft 160, which has a mechanically indirect linkage with the road wheels W.

The mechanism 110 includes a motor gear M1a, a large gear 111a, a ring gear 111, a plurality of planetary gears 112, a sun gear 113 and the input shaft 130. The large gear 111a is engaged with the motor gear M1a. The ring gear 111 is integrally formed inside the large gear 111a. The planetary gears 112 are engaged with the ring gear 111. The sun gear 113 is engaged with the planetary gears 112. The input shaft 130 rotates in agreement with the sun gear 113. A planetary gear mechanism 114, which is composed of the sun gear 113, ring gear 111, planetary gears 112 and a planetary carrier 146 that rotatably supports the planetary gears 112, is disposed in the mechanism 110.

The mechanism 140 for transmitting steering force includes a worm 141, a worm wheel 142, an intermediate gear 144, an output gear 145, the planetary carrier 146 and the shaft 150. The worm 141 is attached to a shaft of the motor M2. The worm wheel 142, which is engaged with the worm 141, rotates at a reduced speed. The intermediate gear 144 is attached to a shaft 143 to which the worm wheel 142 is also attached. The output gear 145 is engaged with the intermediate gear 144. The planetary carrier 146 is secured to the output gear 145. An end portion of the shaft 150 is secured to the planetary carrier 146.

An electromagnetic solenoid 181, which activates a lock mechanism 180 so as to lock the ring gear 111 relative to a housing 170, is attached to the housing 170. The electromagnetic solenoid 181 applies an electromagnetic force to a plunger 181a so that the plunger 181a is selectively extruded to engage with and restored to disengage from one of a plurality of engagement grooves 111b, which are formed in a top surface of the ring gear 111.

Because the plunger 181a is drawn into the electromagnetic solenoid 181 while it is energized (normal state), the plunger 181a is disengaged from an engagement groove 111b. In this way, the ring gear 111 is permitted to freely rotate. In this case, the input shaft 130 and sun gear 113, which lie at a closer side of the hand steering device, rotate independent of the output shaft 160, the rotational shaft 143 and the planetary carrier 146, which lie at a closer side of the road wheels W. This configuration is called a disconnection state, in which a rotational force generated by the motor M1 of the mechanism 110 that rotates according to an amount of manipulation applied to the hand steering device and the speed of a vehicle is transmitted to the input shaft 130 by an electronic control unit (not shown). On the other hand, a rotational force, which is produced by the motor M2 of the mechanism 140 that rotates according to an amount of manipulation applied to the hand steering device by the electronic control unit, is transmitted to the output shaft 160. In this way, an angle of steered road wheel W is controlled without a mechanical linkage with the hand steering device. A pinion 210 in a steering gear box 200 rotates in unison with the output shaft 160 via a universal joint 400. The pinion 210 engages with a rack 320 with a predetermined gear ratio, which moves in unison with tie rods 300 and the road wheels W.

FIG. 12 is a diagram illustrating characteristic curves for steering angle ratio during normal and failure modes, which are achieved by a conventional apparatus for steering a vehicle with steer-by-wire method.

As shown in FIG. 12, the hand steering device of the apparatus 100 for steering a vehicle with steer-by-wire method is adapted to have a steering angle ratio, which is defined as the ratio of an angular displacement of the input shaft 130 to an angular displacement of steered road wheels W. When the speed of a vehicle is higher, the ratio takes a greater value so as to provide less sensitive response to the hand steering device. In contrast, when the speed is lower, the ratio takes a smaller value to provide more sensitive response.

When the apparatus 100 encounters a failure due to an electrical malfunction of the motor M2 for generating steering force, for example, the ring gear 111 falls in a locked condition, because the electromagnetic solenoid 181 is energized. In such a failure, it is impossible that the sun gear 113 and the planetary carrier 146 independently rotate. As the planetary carrier 146 interlocks with the sun gear 113, the input shaft 130 and the output shaft 160 are mechanically connected, so that a rotation of the input shaft 130 is transmitted to the output shaft 160.

Japanese Published Patent Application 2003-137127 discloses the conventional apparatus 100 as shown in FIG. 11. In a case of failure due to a malfunction of the motor M2, because the mechanism 110 and the mechanism 140 are connected in a clutch-like fashion via the planetary gear 112, the rotation of a hand steering device is accordingly transmitted to the mechanism 140 with a predetermined gear ratio.

When the apparatus 100 is in a normal mode on the other hand, the electronic control unit controls the motors M1 and M2 so that an appropriate manipulation of the hand steering device can be achieved.

However, when the apparatus 100 encounters a failure, a characteristic curve K1 for a failure mode is mechanically set to a constant value (constant steering angle ratio), so that a control range R of the steering angle ratio disappears. Because a difference L1 in steering angle ratio between a failure mode and a normal mode, for which a steering angle ratio can be obtained from a characteristic curve J1, results in a greater value, it induces a sudden change in a response for manipulation of a hand steering device. In this way, a driver experiences uneasy feeling in manipulating the hand steering device.

Therefore, it is preferred that an apparatus for steering a vehicle is structurally robust enough to provide the driver with comfortable feeling for manipulation of a hand steering device, even if the apparatus falls in a failure due to a malfunction of a steering motor.

SUMMARY OF THE INVENTION

It is an aspect of the present invention to provide an apparatus for steering a vehicle, which comprises a hand steering device, a road wheel steering device, a steering motor and a connection device. Brief description is given of each of these components below. The hand steering device is a device which a driver of the vehicle manipulates for steering road wheels. The road wheel steering device actuates the road wheels. The steering motor, which is attached to the road wheel steering device, produces an assist force for the road wheels. The connection device selectively connects and disconnects the hand steering device and the road wheel steering device. In the apparatus, a ratio of a displacement made by the hand steering device to a displacement generated by the road wheel steering device increases as a speed of the vehicle becomes greater while the vehicle is traveling in a predetermined range of speed, and a gradient of the ratio is adapted to be greater when the speed is lower. As shown in FIG. 6, according to an exemplary embodiment of the present invention a curve representing the steering angle ratio plotted relative to vehicle speed convexly increases for a range of vehicle speed about 10-100 km/hr to a constant maximum level, but the gradient of the curve increases at a much greater rate at a lower portion of the predetermined intermediate range of speed, e.g., from 10-50 km/hr, than at an upper end portion of the predetermined intermediate range of speed, e.g., 50-100 km/hr.

The displacement generated by the road wheel steering device is meant to be an angle of the steered road wheel from a certain reference position, and the displacement made by the hand steering device is meant to be an angle of manipulation from a certain reference position. The ratio is meant to be a steering angle ratio, the angle of manipulation divided by the angle of the steered road wheel.

Because the apparatus described above reduces a difference in steering angle ratio between normal and failure modes for a range of vehicular lower speeds, it is possible to provide better manipulation for a hand steering device with a reduced level of uneasiness caused by a failure of the apparatus.

It is another aspect of the present invention to provide an apparatus for steering a vehicle, which comprises a hand steering device, a road wheel steering device, a steering motor, a connection device and a rack and pinion mechanism. Brief description is given of each of these components below. The hand steering device is a device which a driver of the vehicle manipulates for steering road wheels. The road wheel steering device actuates the road wheels. The steering motor, which is attached to the road wheel steering device, produces an assist force for the road wheels. The connection device selectively connects and disconnects the hand steering device and the road wheel steering device. The rack and pinion mechanism transmits steering force to the road wheels. In the apparatus, a ratio of a displacement made by the hand steering device to a displacement generated by the road wheel steering device increases as a speed of the vehicle becomes greater while the vehicle is traveling in a predetermined range of speed, and the rack and pinion mechanism has a gear ratio which varies according to an angular position of the hand steering device.

The apparatus described above reduces a difference in steering angle ratio between normal and failure modes by introduction of the rack and pinion mechanism described above, whereby it is possible to provide better manipulation for a hand steering device.

BRIEF DESCRIPTION OF THE DRAWINGS

FIG. 5A for a configuration that a lock member engages with a lock gear, and FIG. 5B for a configuration that a lock member disengages from a lock gear.

DESCRIPTION OF THE PREFERRED EMBODIMENTS

The aspects of the present invention will become more apparent by describing in detail illustrative, non-limiting embodiments thereof with reference to the accompanying drawings.

Figure 1:
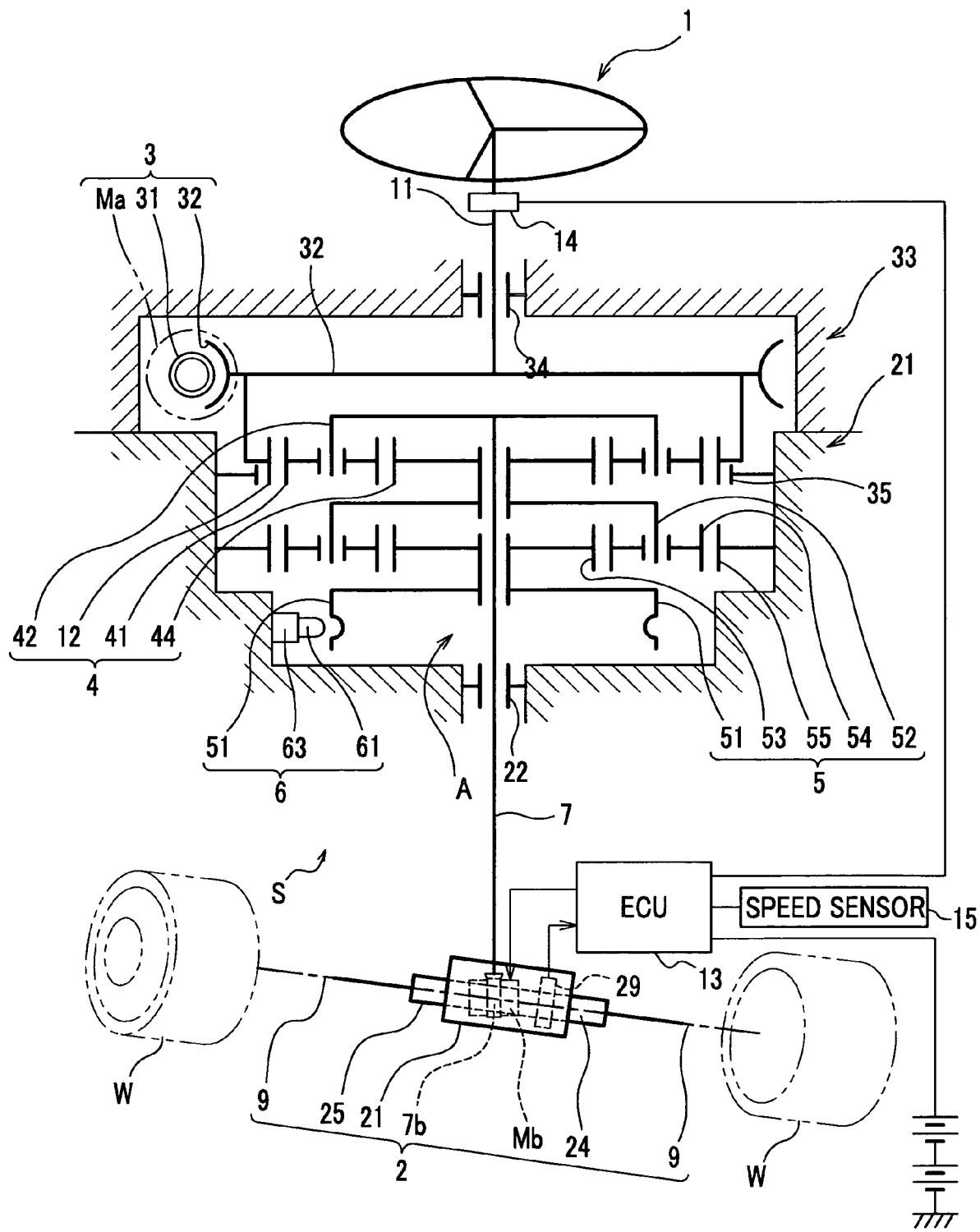
FIG. 1 is a schematic diagram illustrating an apparatus for steering a vehicle according to the present invention.

As shown in FIG. 1, an apparatus S for steering a vehicle is a steer-by-wire steering apparatus which not only controls a road wheel steering device 2 so as to steer road wheels W according to manipulation of a hand steering device 1 conducted by a driver, but also establishes a configuration that the hand steering device 1 is mechanically disconnected from the road wheels W. The apparatus S comprises the hand steering device 1, the road wheel steering device 2, and a steering motor Mb and a connection device which selectively couples and decouples the hand steering device 1 and the road wheel steering device 2. The hand steering device 1 is manipulated by a driver so as to steer the road wheels W. The road wheel steering device 2 steers the road wheels W. The steering motor Mb, which is attached to the road wheel steering device 2, generates an urging force so as to steer the road wheels W.

In this connection, the connection device in the appended claims corresponds to a planetary gear mechanism including a first planetary gear mechanism 4 and a second planetary gear mechanism 5, and a lock mechanism 6 which locks the second planetary gear mechanism 5 so as to mechanically connect the hand steering device 1 and the road wheel steering device 2.

Figure 2:
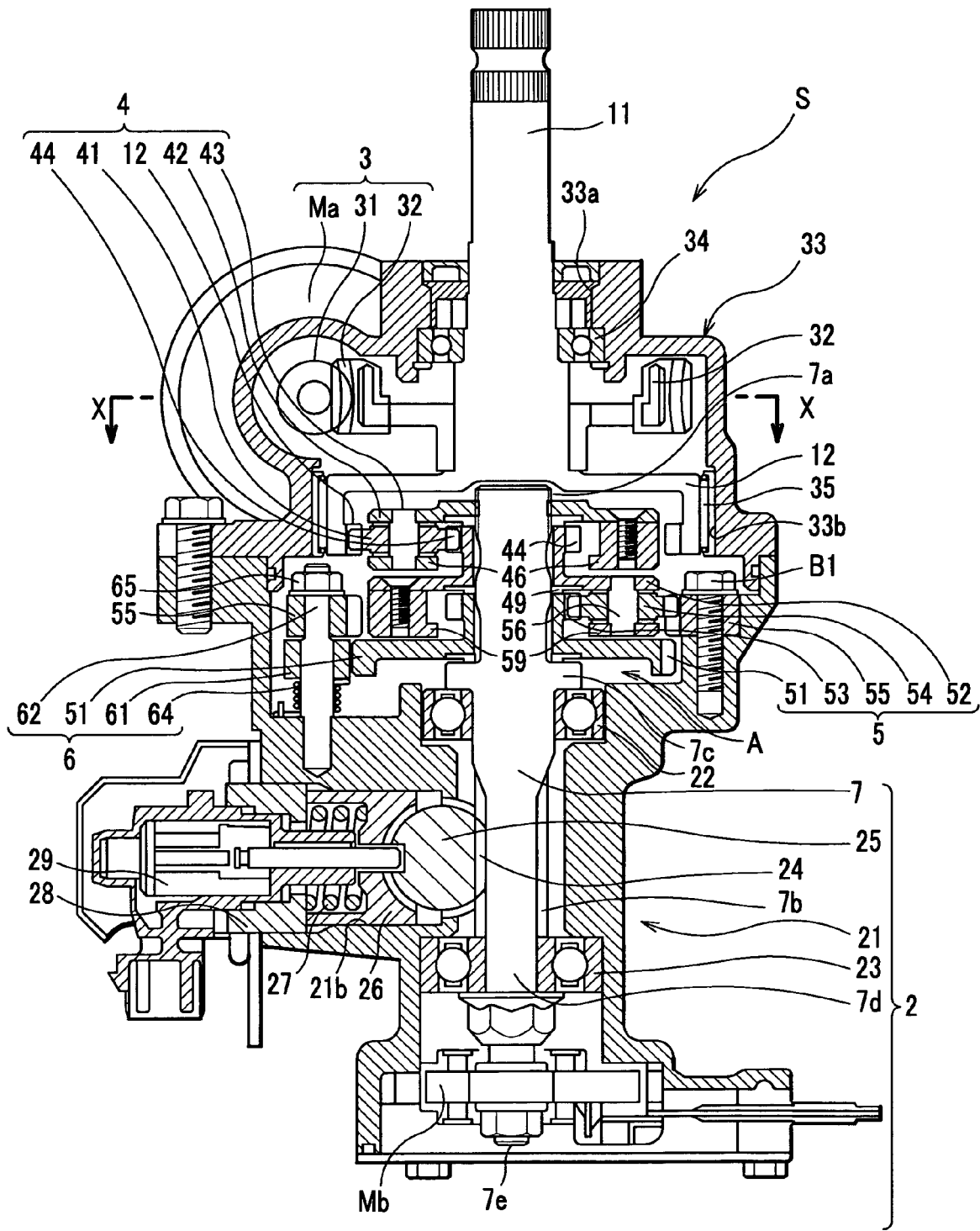
FIG. 2 is a sectional view showing a main portion of an apparatus for steering a vehicle according to the present invention.

For example, the hand steering device 1 comprises a steering wheel, which is secured to a top end of an input shaft 11. The input shaft 11 exemplarily comprises a steering shaft which rotates in unison with the hand steering device 1. As shown in FIG. 2, a first ring gear 12, which is integrally formed with the input shaft 11, is disposed at its bottom end. A worm wheel 32, which is mated with the input shaft 11, is disposed above this first ring gear 12. The input shaft 11 is rotatably supported by first and second bearings 34 and 35, which are attached to an inner wall of an actuator case 33.

As shown in FIG. 2, the first bearing 34 comprising a ball bearing, which radially supports the input shaft 11 with reduced rotational friction, is installed in a bore 33a formed in an upper end portion of the actuator case 33.

The second bearing 35, which comprises a roller bearing for radially supporting an outer circumferential surface of the first ring gear 12, is attached to an inner wall of the actuator case 33 in a space 33b provided in a lower end portion of the actuator case 33.

The first ring gear 12, which comprises an internal gear engaging with a planetary gear 41 of the first planetary gear mechanism 4, is made of a cap-like member which has a closed upper portion and an opened lower portion. The outer circumferential surface of the first ring gear 12 is radially supported by the second bearing 35 in a rotatably free fashion.

Figure 3:
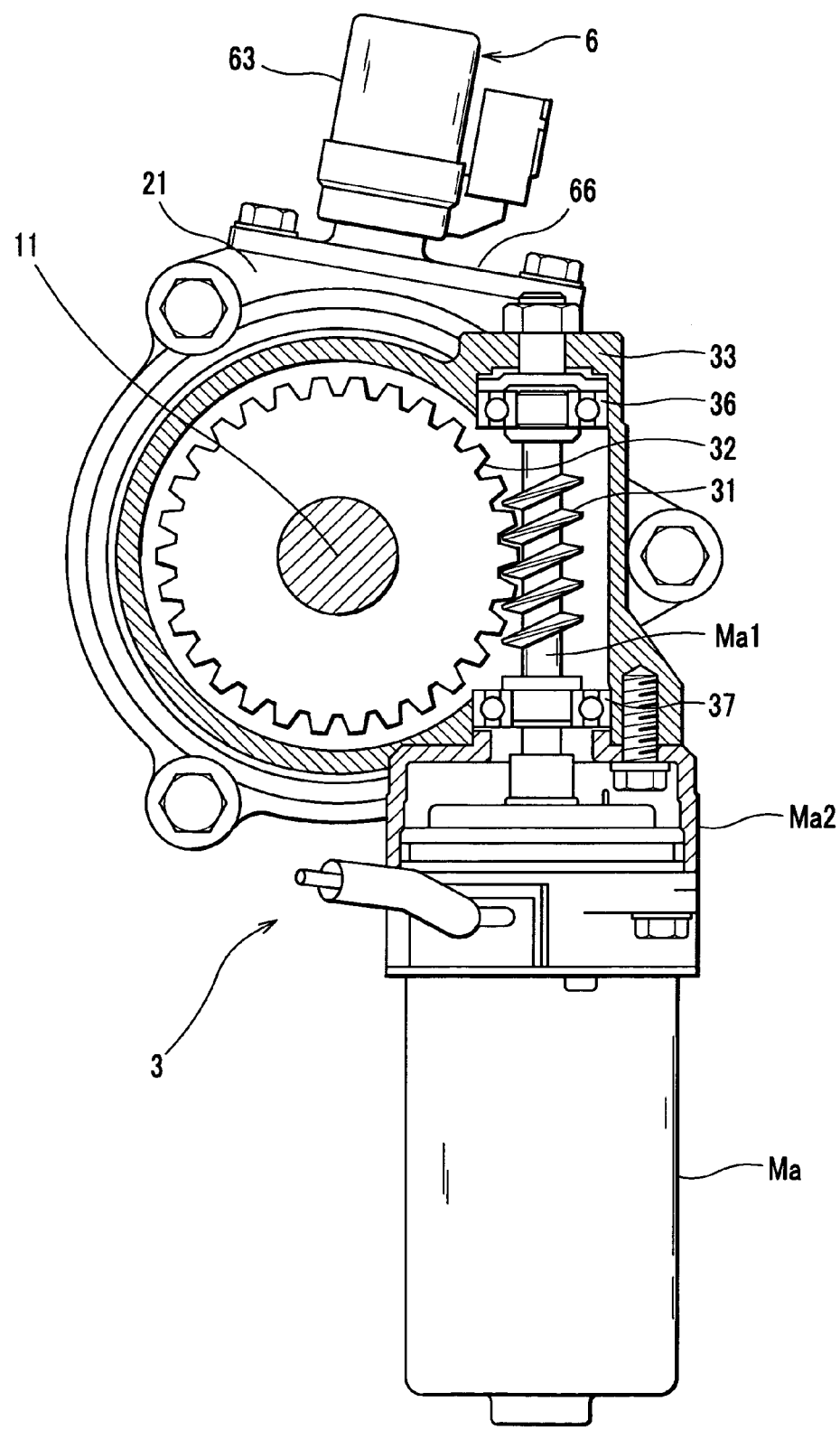
FIG. 3 is an enlarged sectional view showing a main portion of an apparatus for steering a vehicle according to the present invention.

As shown in FIG. 3, a device 3 for generating reaction force has a reaction motor Ma which produces torque while receiving power from a battery (not shown), thereby providing a reaction force to manipulation of the hand steering device 1. In addition to the reaction motor Ma, the device 3 comprises a worm 31 attached to a reaction motor shaft Ma1 and a worm wheel 32 which engages with the worm 31 so as to rotate the input shaft 11 at a reduced speed.

As shown in FIG. 1, when the lock mechanism 6 locks a lock gear 51, the reaction motor Ma serves as an assist mechanism which applies an assist force to the hand steering device 1. In contrast, when the lock mechanism 6 sets the lock gear 51 free, the reaction motor Ma serves as a resistive mechanism, which applies a reaction force to the hand steering device 1. The reaction motor Ma providing the device 3 with drive torque is controlled by an electronic control unit 13 according to a rotational signal of the hand steering device 1 sent by an angle sensor 14, a signal sent by a torque sensor (not shown) and a speed signal sent by a speed sensor 15. The output of the reaction motor Ma is transmitted to the reaction motor shaft Ma1 (see FIG. 3).

As shown in FIG. 3, a motor case Ma2, ball bearings 36 and 37 for radially supporting the reaction motor shaft Ma1, the worm 31 and the worm wheel 32 are installed in the actuator case 33.

The worm 31 engaging with the worm wheel 32 is integrally formed with the reaction motor shaft Ma1. The ball bearings 36 and 37 radially support both above and below the worm 31. The worm wheel 32, which is attached to the input shaft 11, reduces a rotational speed of the worm 31. The worm wheel 32 and the worm 31 form a gear box.

As shown in FIG. 2, the first planetary gear 41 internally engages with the first ring gear 12. The first ring gear 12 is attached to the input shaft 11 which rotates in unison with the worm wheel 32.

As shown in FIGS. 1 and 2, the device 3 for generating reaction force, the first planetary gear mechanism 4, the second planetary gear mechanism 5 and the lock mechanism 6 are installed in a space A, which is formed by the actuator case 33 and a gear box housing 21. The device 3 drives the rotation of the first planetary gear mechanism 4. The second planetary gear mechanism 5 interlocks with the first planetary gear mechanism 4. The lock mechanism 6 locks the lock gear 51 which rotates in unison with a second sun gear 53 of the second planetary gear mechanism 5.

Figure 4:
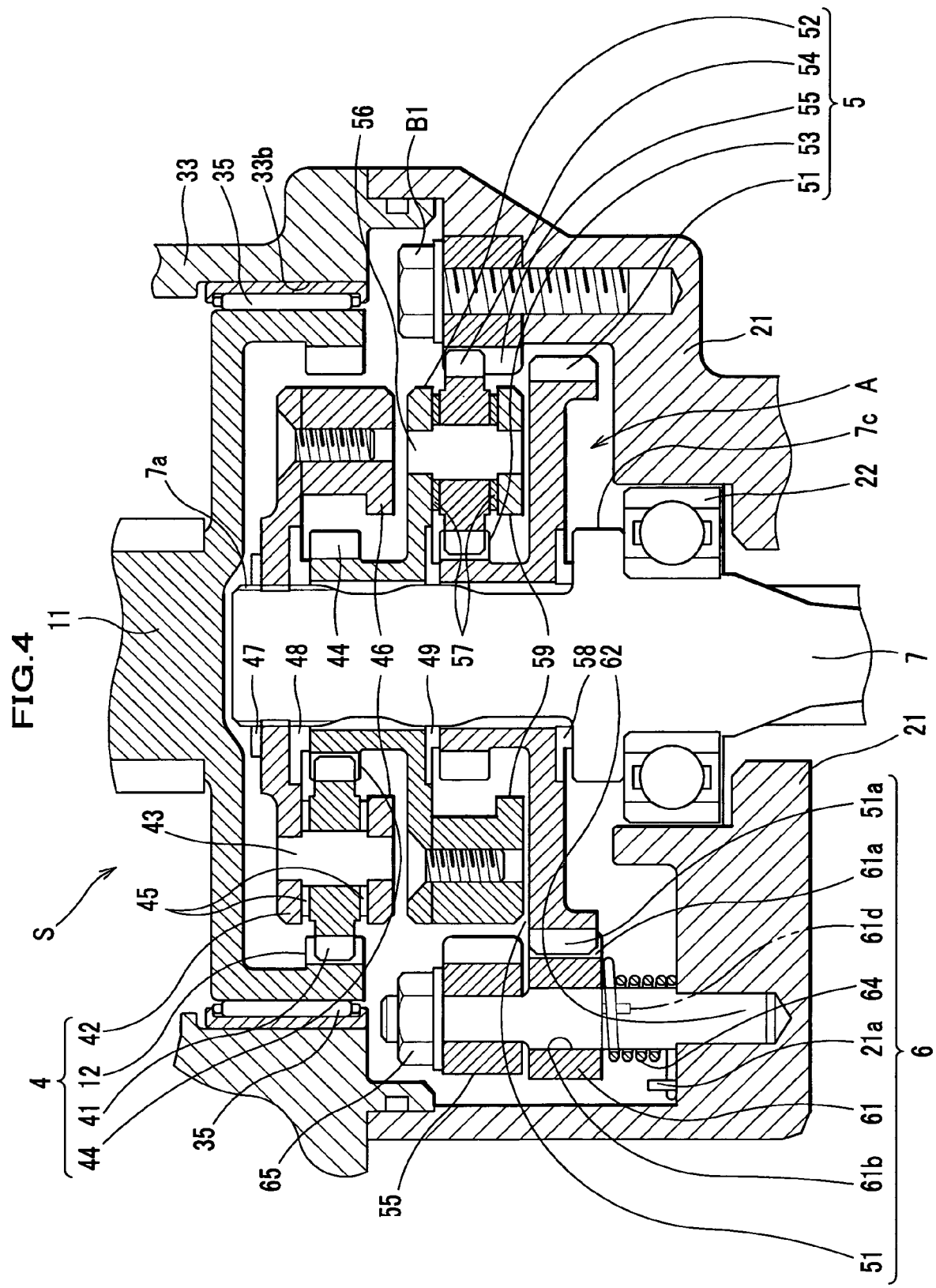
FIG. 4 is a sectional view taken along line X-X in FIG. 2.

As shown in FIGS. 1, 2 and 4, the first planetary gear mechanism 4 is a gear transmission mechanism, which is positioned between the device 3 for generating reaction force and an output shaft 7 of the road wheel steering device 2. The first planetary gear mechanism 4 comprises the first ring gear 12, the first planetary gear 41, a first planetary carrier 42 and a first sun gear 44.

The first planetary gear 41 is not only rotatably supported by a first axis 43, one end of which is secured to the first planetary carrier 42, but also engaged with the first ring gear 12 and the first sun gear 44. Thrust washers 45 are placed on both upper and lower surfaces of the first planetary gear 41 so that the first planetary gear 41 can be rotatably supported about the first axis 43 with a predetermined clearance. A first carrier plate 46 is mated with a lower end portion of the first axis 43.

The first planetary carrier 42 is a disk which supports the first planetary gear 41 in a floated fashion so that the first planetary gear 41 engages with the first ring gear 12. The first planetary carrier 42 is mated with an upper end of the output shaft 7 with splines and secured to it with a ring 47 and a thrust washer 48 so that the first planetary carrier 42 rotates in unison with the output shaft 7.

The first sun gear 44 is a gear member having a cylindrical shape with a flange, which is integrally formed with a second planetary carrier 52 of the second planetary gear mechanism 5. The first sun gear 44 is rotatably supported about the output shaft 7 with a clearance maintained by thrust washers 48 and 49, which also restrain the movement of the first sun gear 44 in an axial direction of the output shaft 7.

As shown in FIG. 4, the second planetary gear mechanism 5 is a gear transmission mechanism, which is positioned between the first planetary gear mechanism 4 and the lock mechanism 6. The second planetary gear mechanism 5 comprises the second planetary carrier 52, a second planetary gear 54, a second ring gear 55, the second sun gear 53 and the lock gear 51.

The second planetary carrier 52 is a disk which supports the second planetary gear 54 in a floated fashion so that the second planetary gear 54 engages with the second ring gear 55 and the second sun gear 53.

The second planetary gear 54 is rotatably supported about a second axis 56, one end of which is secured to the second planetary carrier 52. Thrust washers 57 are placed on both upper and lower surfaces of the second planetary gear 54 so that the second planetary gear 54 can be rotatably supported about the second axis 56. A second carrier plate 59 is mated with a lower end portion of the second axis 56.

The second ring gear 55 comprises an internal gear of a ring-like shape which engages with the second planetary gear 54. The second ring gear 55 is secured not only to a lever shaft 62 which attaches a lock member 61 to a gear box housing 21, but also to an inner wall of the gear box housing 21 by a bolt B1.

The second sun gear 53 is a cylindrical gear member with a flange, which is integrally formed with the lock gear 51 with which the lock member 61 engages. The second sun gear 53 is rotatably supported about the output shaft 7 with a clearance maintained by thrust washers 49 and 58, which also restrain the movement of the second sun gear 53 in an axial direction of the output shaft 7.

Figure 5A:
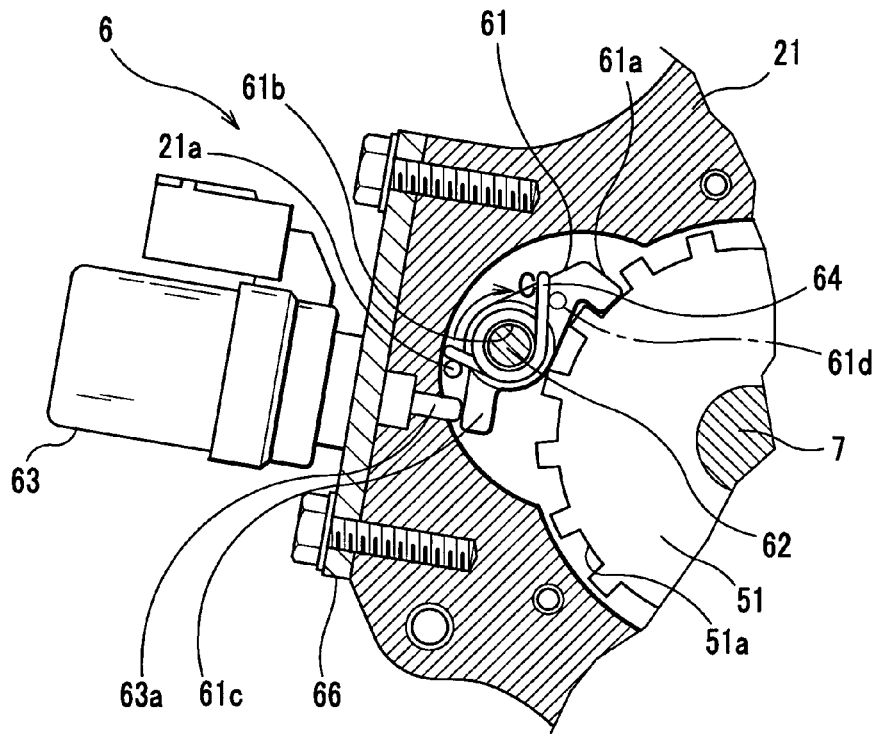
FIGS. 5A and 5B are sectional views showing a main portion of an apparatus for steering a vehicle according to the present invention.
Figure 5B:
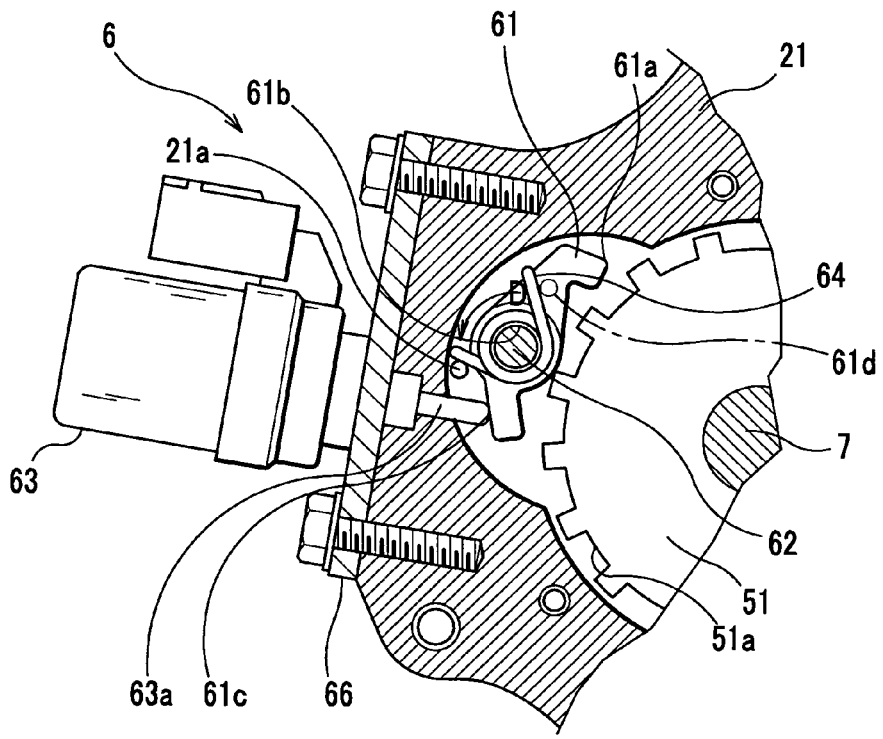

The lock gear 51 is integrally formed with the second sun gear 53 and rotates in unison with it. The lock gear 51 is a gear of a cap-like shape, around which tooth spaces 51a that engage with a claw 61a of the lock member 61 are formed. As shown in FIGS. 5A and 5B, the lock member 61 is positioned so as to engage with the lock gear 51.

The lock mechanism 6 comprises the lock gear 51 of the second planetary gear mechanism 5, the lock member 61, a return spring 64, a lever shaft 62 and an electromagnetic solenoid 63. The lock member 61 engages with the lock gear 51. The return spring 64 automatically restores the lock member 61 to an original position. The lever shaft 62 supports the return spring 64 and the lock member 61. The electromagnetic solenoid 63 actuates the lock member 61 into a released position.

The lock member 61 is a member of a lever-like shape and is rotatably supported about the lever shaft 62. The lock member 61 has an axial hole 61b in its middle position, through which the lock member 61 is supported by the lever shaft 62. The lock member 61 has the claw 61a at one end, which engages with the tooth spaces 51a of the lock gear 51. Also, the other end the lock member 61 has a contact point 61c to which a plunger 63a applies pressure produced by the electromagnetic solenoid 63.

As shown in FIG. 4, the lever shaft 62 is a member of a bolt-like shape and screwed into the gear box housing 21. A nut 65 is tightened about the lever shaft 62 against the second ring gear 55, while the lever shaft 62 provides an axis to the lock member 61 and the return spring 64.

The electromagnetic solenoid 63 works in the following manner, for example. As shown in FIG. 5A, while the power is off, the electromagnetic solenoid 63 is adapted to pull the plunger 63a so that the lock member 61 locks the lock gear 51. On the other hand, while the power is on, the electromagnetic solenoid 63 is adapted to protrude the plunger 63a so that the lock member 61 releases the lock gear 51, as shown in FIG. 5B The electromagnetic solenoid 63 is secured to a bracket 66, which is secured to an outer wall of the gear box housing 21 with bolts.

The return spring 64 is a coil spring disposed around the lever shaft 62. One end of the return spring 64 is in pressured contact with a pin 21a which is secured to the gear box housing 21 and the other end is also in pressured contact with a stopper 61d formed on a lower surface of the lock member 61.

As shown in FIG. 2, the output shaft 7 provides an axis around which the first planetary carrier 42, the first sun gear 44, the second planetary carrier 52, the second sun gear 53 and the lock gear 51 are supported. The output shaft 7, which is coaxially aligned with the steering input axis 11, is rotatably supported by two ball bearings 22 and 23 that are attached to the gear box housing 21. The output shaft 7 comprises the following components which are integrally formed with it: splines 7a, a pinion 7b, a portion 7c with a larger diameter, a portion 7d with a smaller diameter and a threaded portion 7e. The splines 7a are provided for securing the first planetary carrier 42 to an upper end of the output shaft 7. The pinion 7b is positioned in the middle of the output shaft 7. The portion 7c is provided for holding the ball bearing 22 above the pinion 7b with the gear box housing 21. The portion 7d is provided below the pinion 7b for installing the ball bearing 23. The portion 7e is provided below the portion 7d for installing the steering motor Mb. Furthermore, a rotational angle sensor (not shown) for monitoring rotation of the output shaft 7 is disposed in the vicinity of the lower end of the output shaft 7.

As shown in FIG. 1, the road wheel steering device 2 rotatably actuates the output shaft 7 by a torque generated by the steering motor Mb which is controlled by the electronic control unit 13 during a normal mode. In this way, the road wheel steering device 2 applies translational movement to tie rods 9 via the pinion 7b and a rack bar 25, thereby steering the road wheels W.

In contrast, during a failure mode due to a malfunction of the steering motor Mb, for example, the road wheel steering device 2 actuates the road wheels W in the following manner. As the lock mechanism 6 locks the second planetary gear mechanism 5, the first planetary gear mechanism 4 which interlocks with the input shaft 11 comes into connection with the road wheel steering device 2. In this way, the road wheel steering device 2 applies translational movement to the tie rods 9 via the pinion 7b and the rack bar 25 so as to manually steer the road wheels W.

The steering motor Mb serving as an actuator for the road wheel steering device 2 applies rotation to the output shaft 7, being supplied with current which is controlled by the electronic control unit 13 according to a signal indicative of the rotational angle of the hand steering device 1 sent by the angle sensor 14 and a signal indicative of the speed of a vehicle sent by the speed sensor 15.

The pinion 7b is a helical pinion gear having a constant pitch and integrally formed with the output shaft 7. As shown in FIG. 1, the pinion 7b is disposed inside the gear box housing 21 and engages with a rack 24.

As shown in FIG. 2, the rack 24 is integrally formed with the rack bar 25, which is freely supported in right and left directions inside the gear box housing 21.

As shown in FIG. 1, the tie rods 9 protrude from both ends of the rack bar 25. The right and left road wheels W are attached to the tie rods 9 through knuckles (not shown).

A side hole 21b, which is provided for installing a pressure member 26 that applies pressure to the rack bar 25 in a horizontal direction, is made in the gear box housing 21. The pressure member 26, a spring 27, a closing member 28 are installed inside the side hole 21b. The pressure member 26 contacts with a back surface of the rack bar 25. The spring 27 applies pressure to the pressure member 26 toward the pinion 7b. The closing member 28 serves as not only a receiving member for the spring 27 but also a closure for the side hole 21b. A potentiometer 29 for monitoring a stroke of the rack 24 is disposed outside the closing member 28.

Because the back surface of the rack bar 25 is pressed by the pressure member 26 to which the spring 27 applies a force, a potential backlash between the rack 24 and the pinion 7b can be avoided.

Figure 6:
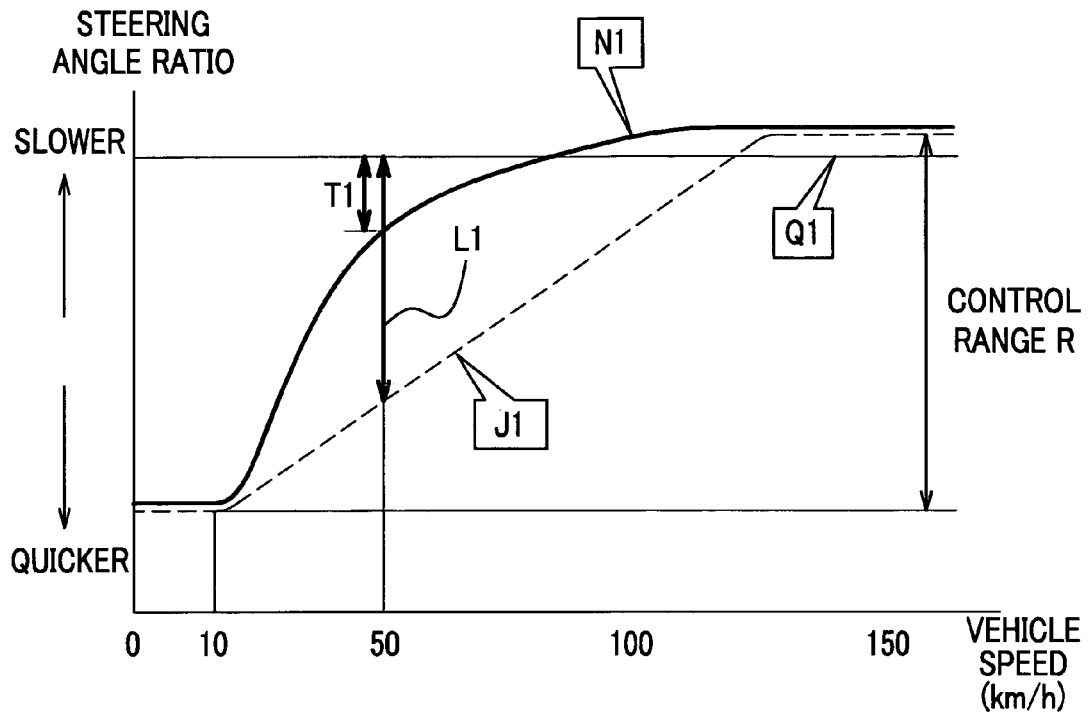
FIG. 6 is a diagram showing the relationship between steering angle ratio and vehicle speed according to the present invention.
Figure 12:
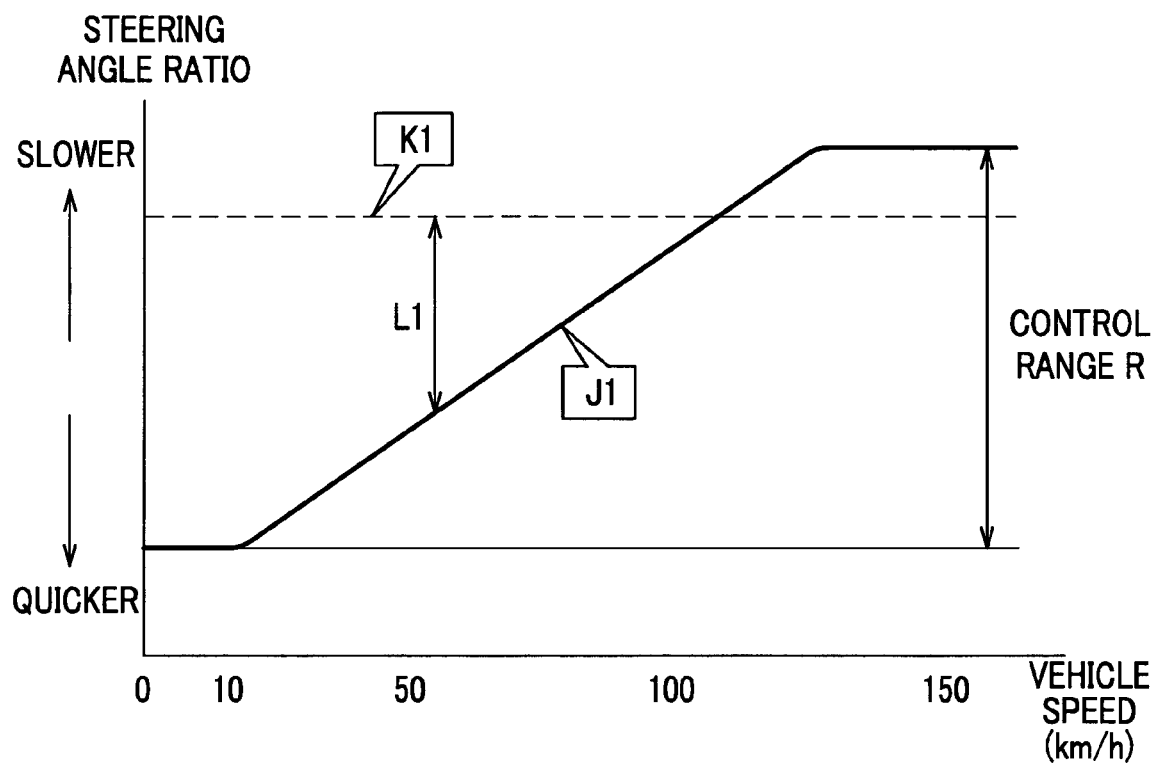
FIG. 12 is a diagram illustrating characteristic curves for steering angle ratio during normal and failure modes, which are achieved by a conventional apparatus for steering a vehicle with steer-by-wire method.

FIG. 6 is a diagram showing the relationship between steering angle ratio and vehicle speed according to the present invention. In FIG. 6, the vertical axis represents the steering angle ratio, which is meant to be a ratio of an angle of manipulation to an angle of steered road wheel, and the horizontal axis represents the speed of a vehicle. The bold line represents a characteristic curve N1 for controlling of steering angle ratio vs. vehicle speed during a normal mode, which is achieved by an apparatus S for steering a vehicle according to the present invention. The broken line, on the other hand, represents a characteristic curve J1 according to the conventional technique. The fine line represents a characteristic curve Q1 for controlling of steering angle ratio vs. vehicle speed during a failure mode according to the present invention. In this connection, the characteristic curve Q1 is the same as the characteristic curve K1 for mechanical controlling of steering angle ratio according to the conventional technique, as shown in FIG. 12. As shown, the ratio of the displacement made by the hand steering device to the displacement generated by the road wheel steering device as controlled by the controller in the normal mode N1 approaches a ratio of the displacement when the hand steering device is connected to the road wheel steering device during the failure mode Q1 at speeds within the approximately upper half portion of the predetermined intermediate range of speed.

The electronic control unit 13 shown in FIG. 1 controls the steering motor Mb so as to apply rotation to the pinion 7b according to the characteristic curve N1 during a normal operation, which convexly increases for a range of vehicular speed about 10 to 100 km/h as shown in FIG. 6.

Next, description is given of operation of an apparatus for steering a vehicle according to the present invention with reference to FIGS. 1 and 6.

First referring to FIG. 1, description is given of a configuration of an apparatus S for steering a vehicle during normal operation while a lock mechanism 6 is released by an electromagnetic solenoid 63 which is energized by supplied current.

When the current flows into the electromagnetic solenoid 63, the lock mechanism 6 is in a released position which is established by a lock member 61 standing away from a lock gear 51. As a result, a second planetary gear mechanism 5 is allowed to rotate, and not only a device 3 for generating reaction force but also a road wheel steering device 2 work normally. The device 3 controls reaction force so as to assist manipulation of a hand steering device 1.

If a driver manipulates the hand steering device 1, a planetary gear 41 of a first planetary gear mechanism 4 rotates via an input shaft 11 and a first ring gear 12. As the load applied to a first planetary carrier 42 is greater, because the carrier 42 is coupled to road wheels W via an output shaft 7, a pinion 7b and a rack 24, a first sun gear 44 whose load is smaller increases its rotational speed. As a result of rotation of the first sun gear 44, a released condition is established, where a second planetary carrier 52 which is integrally formed with the first sun gear 44, a second planetary gear 54 and a lock gear 51 are permitted free rotation.

If a driver manipulates the hand steering device 1 under the released condition of the lock mechanism 6, the rotation of the hand steering device 1 is not transmitted to the output shaft 7 while the lock gear 51 of the lock mechanism 6 rotates. This means that configuration of steer-by wire system is established. The first planetary gear 41 works as a clutch mechanism which is able to selectively connect and disconnect the input shaft 11 and the output shaft 7. In this way, the road wheel steering device 2 actuates steering of road wheels W according to manipulation of the hand steering device 1 by a driver, while the hand steering device 1 and the road wheel steering device 2 are mechanically disconnected from each other.

When the lock mechanism 6 is released, the apparatus S conducts steering with a steer-by-wire method according to commands sent by an electronic control unit 13.

The electronic control unit 13 controls a steering angle of the road wheels W according to manipulation (manipulated angle) of the hand steering device 1, taking into account a steering angle ratio. As shown in FIG. 6, for example, the electronic control unit 13 controls a steering motor Mb to apply rotation to the pinion 7b, based on the characteristic curve N1 for controlling of steering angle ratio. The characteristic curve N1 is adapted not only to take higher values but also to be convex during a normal mode over a range of vehicular speed about 10 to 100 km/h.

When the speed of a vehicle detected by a speed sensor 15 falls in a low speed range of 0 to about 10 km/h, the electronic control unit 13 controls the steering motor Mb according to the characteristic curve N1, which provides a constant and minimum value for this speed range. As a result, the displacement of a rack bar 25 (angle of steered road wheel) relative to manipulation (angle of manipulation) of the hand steering device 1 will be greater and uniform.

In this way, because a driver is able to manipulate the hand steering device 1 with quicker response, it is possible to provide him with steering feeling appropriate for the low speed range, when a vehicle is garaged, for example.

When the speed of a vehicle falls in a high speed range of 100 km/h or more, the electronic control unit 13 controls the steering motor Mb according to the characteristic curve N1, which provides a constant and maximum value for this speed range. As a result, the displacement of the rack bar 25 (angle of steered road wheel) relative to manipulation (angle of manipulation) of the hand steering device 1 will be smaller and substantially constant. In this way, in the vicinity of neutral position of the hand steering device 1 which includes about a half revolution in both right and left directions relative to the neutral position, the steering angle ratio (angle of manipulation to angle of steered road wheel) is adapted to be higher. Because a driver is able to manipulate the hand steering device 1 with slower response, it is possible to provide him with steering feeling appropriate for the high speed range which eliminates unstableness of the hand steering device 1.

Next, description is given of an apparatus S for steering a vehicle during a failure with reference to FIGS. 1 and 6.

When the apparatus S fails due to an electrical malfunction, current is not supplied to an electromagnetic solenoid 63. Under this condition a lock mechanism 6 is in a locked condition and a device 3 for generating reaction force does not work, so that no assist force is applied to a hand steering device 1.

When a driver manipulates the hand steering device 1, the torque applied to it is transmitted to a first ring gear 12 of a first planetary gear mechanism 4 via an input shaft 11. This torque is further transmitted to a first planetary gear 41, where the rotational speed of a first planetary carrier 42 is increased and the torque is transmitted to an output shaft 7. This torque is transmitted from a pinion 7b, which is formed on the output shaft 7, to road wheels W via a rack 24 and a rack bar 25.

Therefore, the apparatus S is able to mechanically connect the input shaft 11 and the output shaft 7 when a steering motor Mb and an electronic control unit 13 fail due to disconnection of supplied power.

As shown in FIG. 6, when a vehicle travels at a medium speed of about 50 km/h, for example, it is possible to decrease a difference T1 in steering angle ratio between normal and failure modes, compared with a difference L1 achieved by a conventional apparatus. Because the apparatus S is thus able to eliminate uneasiness for a driver if the apparatus S encounters a failure, the apparatus S provides better manipulation of the hand steering device 1.

Next, description is given of another embodiment with modification of the present invention with reference to FIGS. 7 to 10.

Figure 7:
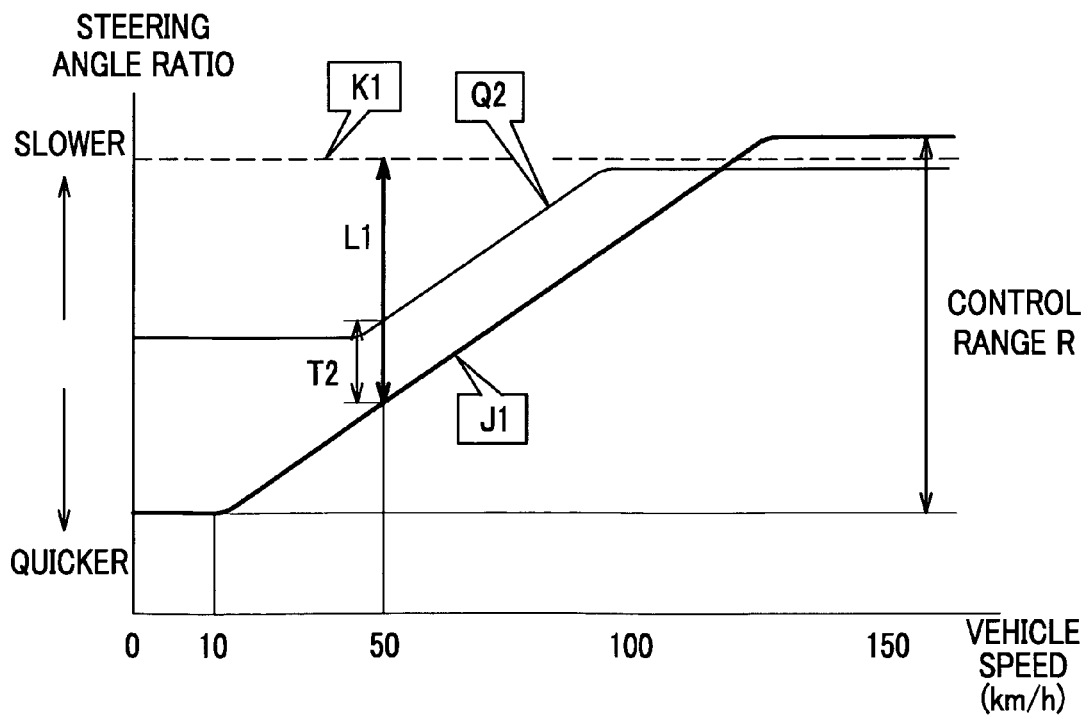
FIG. 7 is a diagram showing the relationship between steering angle ratio and vehicle speed according to the present invention.

FIG. 7 is a diagram showing the relationship between steering angle ratio and vehicle speed according to the present invention.

Figure 8:
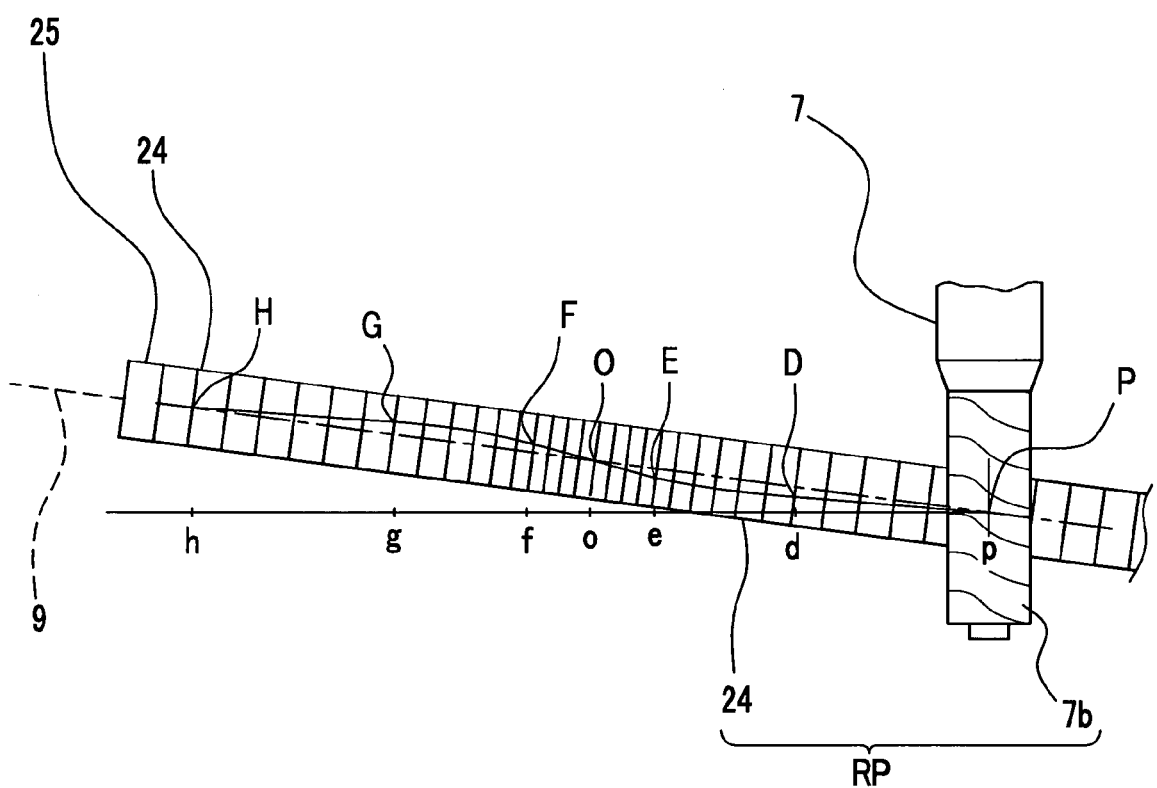
FIG. 8 is a schematic diagram illustrating a rack and pinion mechanism applied to an apparatus for steering a vehicle according to the present invention.

As shown in FIG. 7, a characteristic curve Q2 for a failure mode is adapted to be closer to a characteristic curve J1 for a normal mode by introducing a rack and pinion mechanism RP shown in FIG. 8. In this way, it is possible to decrease a difference T2 in steering angle ratio between normal and failure modes.

Description is given of the rack and pinion mechanism RP with reference to FIG. 8.

FIG. 8 is a schematic diagram illustrating a rack and pinion mechanism applied to an apparatus for steering a vehicle according to the present invention.

As shown in FIG. 8, the rack and pinion mechanism RP comprises a pinion 7b which engages with a rack 24. The pinion 7b has helical teeth with a constant pitch. The rack 24 has teeth which are adapted to have different pitches according to their positions.

For example, the teeth of the rack 24 are configured in the following manner. As shown in FIG. 8, when rotation of constant speed is applied to the pinion 7b resting at an utmost right point P, making a first full rotation of the pinion 7b allows a rack bar 25 to move from point P to point D, a second full rotation from point D to point E, a third full rotation from point E to F, a fourth full rotation from point F to point G and a fifth full rotation from point G to point H according to the pitches of teeth of the rack 24.

The pitches in the vicinity of a center O of the rack 24 (range E to F) are adapted to be shorter so that a stroke of the rack 24, which is represented by a distance e-f, is made smaller. In a range D to E and a range F to G, which lie at right and left sides next to the range E to F respectively, a pitch is adapted to be longer as a tooth goes further away from the center O, so that a stroke of the rack 24 (*d-e* and f-g) becomes greater accordingly. Furthermore, in a range P to D and a range G to H, which lie outside the range D to E and the range F to G respectively, pitches are adapted to be substantially constant and much longer, so that a stroke of the rack 24 (*p-d* and g-h) takes a maximum value.

When the rack 24 is employed for a road wheel steering device, its center O shown in FIG. 8 is adjusted to coincide with a position of the rack 24 at which a vehicle travels straight (an angle of manipulation equals 0 degrees).

If this rack and pinion mechanism RP is applied to an apparatus S for steering a vehicle (see FIG. 1), it is possible to obtain different gear ratios and strokes of the rack 24 according to speed ranges such as high, medium and low-speed ranges.

Figure 9:
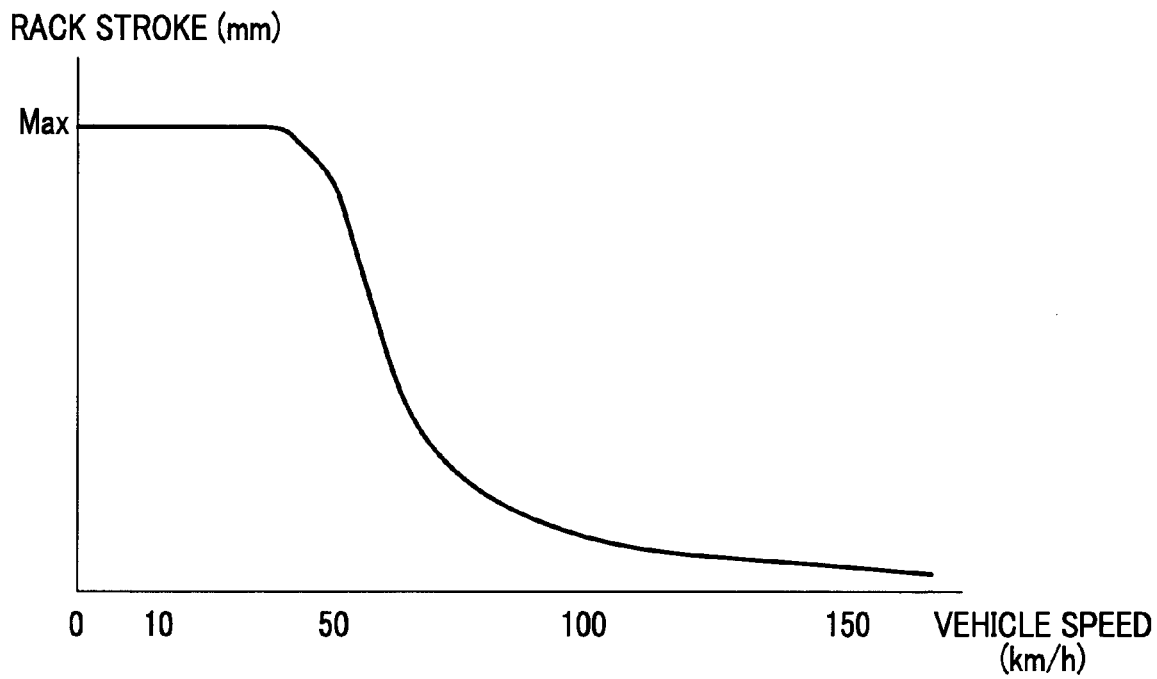
FIG. 9 is a graph showing a characteristic curve for the relationship between rack stroke and vehicle speed.
Figure 10:
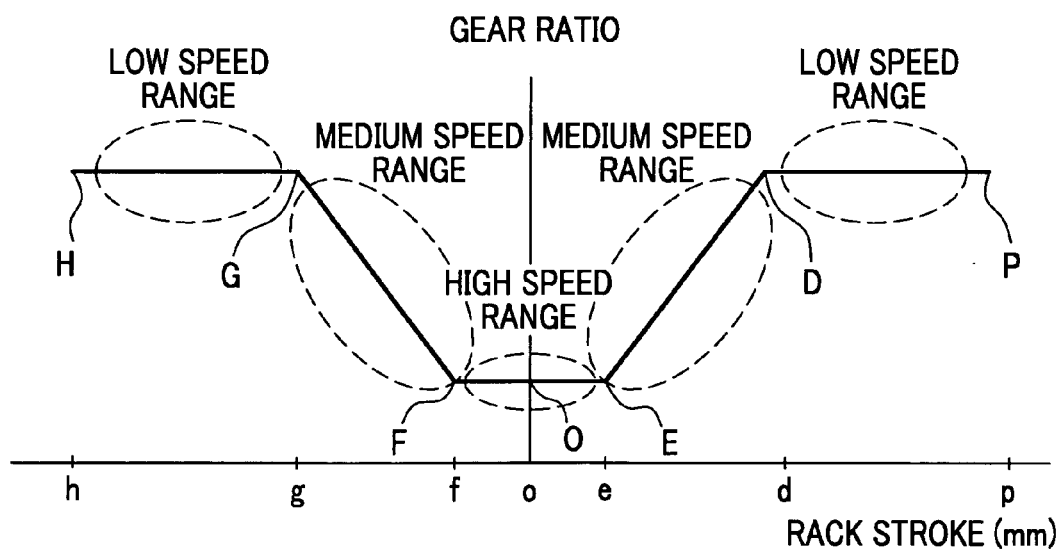
FIG. 10 is a graph showing a characteristic curve for the relationship between rack stroke and gear ratio.
Figure 11:
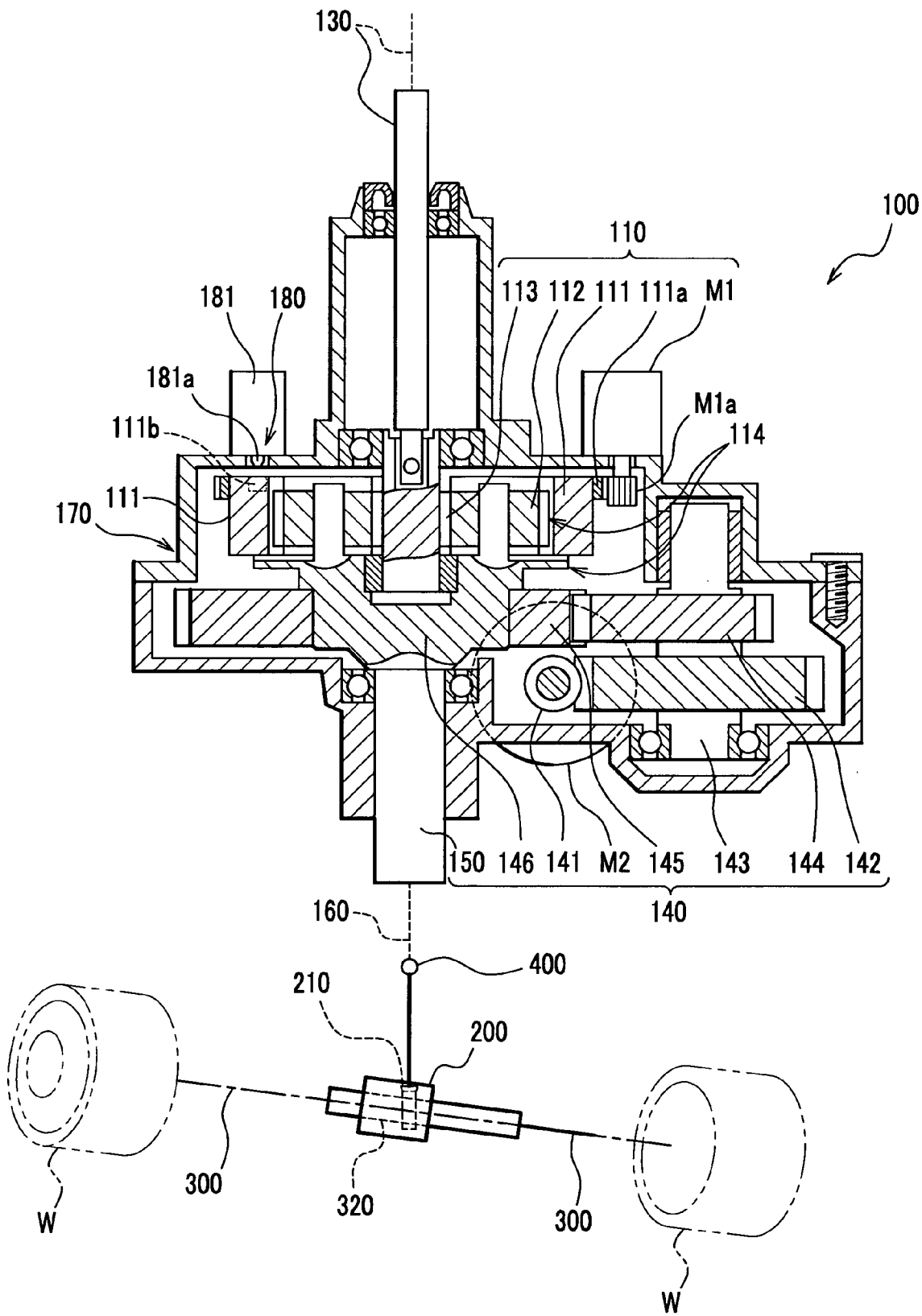
FIG. 11 is a sectional view showing a conventional apparatus for steering a vehicle with steer-by-wire method.

Description is given of the characteristics curve Q2 shown in FIG. 7 with reference to FIGS. 9 and 10.

FIG. 9 is a graph showing a characteristic curve for the relationship between rack stroke and vehicle speed. FIG. 10 is a graph showing a characteristic curve for the relationship between rack stroke and gear ratio.

As shown in FIG. 9, because the range of manipulation for a hand steering device depends on the speed of a vehicle, a maximum rack stroke is required for an apparatus for steering a vehicle locally over a range of the speed of vehicle. For example, it is possible that a rack stroke reaches the maximum in a low speed range of 0 to 40 km/h. In a medium speed range of 40 to 90 km/h, smaller rack strokes are generally sufficient over the range. Furthermore, in a high speed range of 90 km/h or more, much smaller rack strokes are generally acceptable.

When the rack and pinion mechanism RP shown in FIG. 8 is employed, the relationship between gear ratio and rack stroke shown in FIG. 10 is achieved. Gear ratios are adapted to be small while rack strokes are small. The gear ratios progressively increase as the rack strokes increase. After the rack strokes reach a predetermined value, the gear ratios take a constant value. In this connection, the range F to E, range E to D as well as F to G and range D to P as well as G to H correspond to a high speed range, a medium speed range and a low speed range, respectively. Thus, a gear ratio of the rack and pinion mechanism is configured to progressively increase with increasing rack stroke in a predetermined range of rack strokes such that a characteristic curve representing the relationship between steering angle ratio and vehicle speed for a vehicle operating in the normal steering mode has a shape which approaches, but is different from that of, a characteristic curve representing the relationship between steering angle ratio and vehicle speed for a vehicle operating in the failure steering mode during at least part of a predetermined range of speed.

In this way, introducing the rack and pinion mechanism RP shown in FIG. 8, the apparatus S for steering a vehicle can provide effects similar to those which are obtained by a variable gear ratio according to vehicle speeds, from the point of view of manipulation of a hand steering device. The characteristic curve Q2 shown in FIG. 7 schematically illustrates these effects achieved by the rack and pinion mechanism RP.

Description is given of operation of an apparatus for steering a vehicle according to the embodiment of the present invention described above with reference to the FIGS. 7 to 10.

Referring to FIG. 7, description is given of a normal mode. When an apparatus S for steering a vehicle is in a normal mode, an electronic control unit 13 provides a characteristic curve J1 as shown in FIG. 7.

Next, description is given of the relationship between rack stroke and vehicle speed for a rack and pinion mechanism RP when the apparatus S is in a failure mode with reference to FIGS. 7 to 10. The description is categorized into three ranges in terms of vehicle speed, high, medium and low speeds.

a. High Speed Range

As shown in FIG. 10, when an angle of manipulation of a hand steering device 1 lies within 180 degrees right and 180 degrees left from an angle of 0 degrees, which corresponds to the proximity of neutral position (point E to point F), the pitch of teeth of rack 24 is adapted to be small. As a result, a steering angle ratio (angle of manipulation divided by angle of steered road wheel) is set to be higher, which results in a smaller angle of steered road wheel W relative to manipulation of the hand steering device 1.

In this way, during a failure mode where rotation of the hand steering device 1 is transmitted to the pinion 7b, the apparatus S is able to provide operational feeling appropriate for a vehicle traveling in a high speed range, because the apparatus S applies slow rotation to the output shaft 7 so as to avoid unstableness of the hand steering device 1. In the proximity of neutral position, the gear ratio is selected to be constant, so that movement of the rack bar 25 relative to manipulation of the hand steering device 1 is uniform accordingly.

As shown in FIG. 7, when a vehicle travels at 90 km/h or more, the characteristic curve Q2 for a failure mode provides a higher steering angle ratio (slower response). In this way, the apparatus S is able to give a slower response similar to that provided by the conventional characteristics curve J1 for a normal mode, in which a steering motor Mb applies an assist force to the hand steering device 1.

b. Medium Speed Range

As shown in FIG. 10, when an angle of hand steering device increases by 360 degrees starting from an angle of 180 degrees to 540 degrees in both right and left directions, which corresponds to a range of manipulation (point E to point D and point F to point G), pitches of the teeth of rack 24 gradually increase as their positions are apart from one of point E and point F. As a result, gear ratios (rack stroke to pinion angle) gradually increase, so that a large stroke of the rack 24 is achieved. Because a gear ratio increases in proportion to an angle of manipulation of the hand steering device 1, displacement of the rack bar 25 increases in proportion to this angle. Therefore, the apparatus S is able to provide steering feeling appropriate for a vehicle traveling in a medium speed range.

As shown in FIG. 7, when a vehicle travels in a medium speed range of about 40 to 90 km/h, the characteristic curve Q2 for a failure mode provides steering angle ratios, which are adapted to be proportional to vehicle speeds and give slower responses. In this way, the apparatus S is able to give responses similar to those represented by the conventional characteristic curve J1 for a normal mode.

Therefore, the apparatus S is able to eliminate uneasiness felt by a driver even if the apparatus S encounters a failure.

c. Low Speed Range

As shown in FIG. 10, when an angle of manipulation of the hand steering device 1 further increases by 360 degrees starting from an angle of 540 degrees to 900 degrees in right and left directions, which corresponds to a range of manipulation (point G to point H and point D to point P), pitches of teeth of the rack 24 are adapted to be constant and longer. As a result, gear ratios (rack stroke to pinion angle) increase, so that a large stroke of the rack 24 is achieved.

Because the apparatus S is able to quickly move the output shaft 7 during a failure mode, it is possible to facilitate a large angle of steered road wheel W by smaller manipulation of the hand steering device 1 in such a case as garaging of a vehicle. Therefore, the apparatus S is able to provide steering feeling appropriate for a vehicle traveling in a low speed range.

As shown in FIG. 7, when a vehicle travels in a low speed range of about 0 to 40 km/h, the characteristic curve Q2 for a failure mode provides steering angle ratios, which are adapted to be smaller and give quicker responses. In this way, the apparatus S for steering a vehicle is able to give the responses closer to those provided by the conventional characteristics curve J1 for a normal mode. A difference in steering angle ratio T2 is remarkably decreased compared with L1 which is achieved by a conventional characteristic curve K1 for a failure mode.

In this way, the apparatus S is able to eliminate uneasiness felt by a driver even if the apparatus S encounters a failure.

It will now be appreciated from the foregoing description that the present invention is not limited to the particularly illustrated embodiment discussed above and may be carried out in various modified forms.

Foreign priority document, JP 2004-001686 filed on Jan. 7, 2004, is hereby incorporated by reference.

What is claimed is:

1. An apparatus for steering a vehicle comprising:
   a hand steering device which a driver of the vehicle manipulates for steering road wheels;
   a road wheel steering device which actuates the road wheels and including a rack and pinion mechanism for transmitting steering force to the road wheels;
   a steering motor, which is attached to the road wheel steering device, for producing an assist force for the road wheels;
   a connection device for selectively disconnecting the hand steering device and the road wheel steering device during a normal steering mode and connecting the hand steering device and the road wheel steering device during a failure steering mode; and
   a controller which is configured to control the road wheel steering device during the normal steering mode such that a ratio of a displacement made by the hand steering device to a displacement generated by the road wheel steering device increases as a speed of the vehicle becomes greater while the vehicle is traveling in a predetermined range of speed,
   wherein the rack and pinion mechanism has a gear ratio which varies according to an angular position of the hand steering device; and
   wherein a gear ratio of the rack and pinion mechanism is configured to progressively increase with increasing rack stroke in a predetermined range of rack strokes such that a characteristic curve representing the relationship between steering angle ratio and vehicle speed for a vehicle operating in the normal steering mode has a shape which approaches, but is different from that of, a characteristic curve representing the relationship between steering angle ratio and vehicle speed for a vehicle operating in the failure steering mode during at least part of said predetermined range of speed.

2. An apparatus according to claim 1, wherein said apparatus is a steer-by-wire apparatus.

3. An apparatus according to claim 1, wherein said connection device includes a planetary gear mechanism and a lock mechanism which selectively engages the planetary gear mechanism to connect the hand steering device and the road wheel steering device.

4. An apparatus according to claim 3, wherein said lock mechanism includes an electromagnetic actuator which normally unlocks the lock mechanism to disconnect the hand steering device and the road wheel steering device.

5. An apparatus according to claim 1, wherein the gear ratio of the rack and pinion mechanism is configured such that a transition between operation in the normal steering mode to operation in the failure steering mode is substantially seamless.

6. An apparatus according to claim 1, wherein the pinion of the rack and pinion mechanism comprises teeth with a constant pitch and the rack of the rack and pinion mechanism comprises teeth that have different pitches according to the teeth position on the rack.

7. An apparatus for steering a vehicle comprising:
   a hand steering device which a driver of the vehicle manipulates for steering road wheels;
   a road wheel steering device which actuates the road wheels and including a rack and pinion mechanism for transmitting steering force to the road wheels;
   a steering motor, which is attached to the road wheel steering device, for producing an assist force for the road wheels;
   a connection device for selectively disconnecting the hand steering device and the road wheel steering device during a normal steering mode and connecting the hand steering device and the road wheel steering device during a failure steering mode; and
   a controller which controls the road wheel steering device such that a ratio of a displacement made by the hand steering device to a displacement generated by the road wheel steering device increases as a speed of the vehicle becomes greater while the vehicle is traveling in a predetermined range of speed, and wherein the rack comprises teeth that have different pitches according to the teeth position on the rack such that a gear ratio of the rack and pinion mechanism progressively increases with increasing rack stroke in a predetermined range of rack strokes and such that a characteristic curve representing the relationship between steering angle ratio and vehicle speed for a vehicle operating in the normal steering mode has a shape which approaches, but is different from that of, a characteristic curve representing the relationship between steering angle ratio and vehicle speed for a vehicle operating in the failure steering mode during at least part of said predetermined range of speed, whereby a transition between operation in the normal mode to operation in the failure mode is substantially seamless.

\* \* \* \* \*